United States Patent
Higurashi et al.

(10) Patent No.: US 6,560,401 B1
(45) Date of Patent: May 6, 2003

(54) METHOD AND APPARATUS FOR RECORDING AND REPRODUCING INFORMATION

(75) Inventors: Seiji Higurashi, Fuchu (JP); Yasuaki Yamada, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/394,687

(22) Filed: Sep. 13, 1999

(30) Foreign Application Priority Data

Oct. 21, 1998 (JP) .......................................... 10-299232

(51) Int. Cl.[7] ................................................ H04N 5/93
(52) U.S. Cl. .............................. 386/52; 386/55; 386/60; 386/111
(58) Field of Search ............................. 386/52, 55, 111, 386/109, 4, 33, 64, 124, 46, 60; 369/83; H04N 5/93

(56) References Cited

U.S. PATENT DOCUMENTS

| | | | | |
|---|---|---|---|---|
| 5,732,183 A | * | 3/1998 | Sugiyama | 386/111 |
| 5,822,024 A | * | 10/1998 | Setogawa et al. | 386/4 |
| 5,917,988 A | * | 6/1999 | Eto | 386/52 |
| 6,046,971 A | * | 4/2000 | Ogasawara | 386/52 |
| 6,201,925 B1 | * | 3/2001 | Brewer et al. | 386/52 |
| 6,256,451 B1 | * | 7/2001 | Mitsui | 386/52 |
| 6,285,361 B1 | * | 9/2001 | Brewer et al. | 386/52 |
| 6,301,428 B1 | * | 10/2001 | Linzer | 386/52 |

FOREIGN PATENT DOCUMENTS

| | | |
|---|---|---|
| EP | 0694921 | 1/1996 |
| EP | 0735780 | 10/1996 |
| JP | 8-163499 | 6/1996 |

OTHER PUBLICATIONS

Hurst et al: "MPEG Splicing–Tutorial and Proposed SMPTE Standard" Proceedings of the SMPTE technical conference, XX, XX, Nov. 1997 (Nov. 1997), pp. 105–117, XP002098562.

Wee S J et al: "Splicing MPEG Video Streams in the Compressed Domain" IEEE workshop on multimedia signal processing. Proceedings of signal processing society workshop on multimedia signal processing, XX, XX, Jun. 23, 1997 (Jun. 23, 1997), pp. 225–230, XP000957700.

* cited by examiner

*Primary Examiner*—Vincent F. Boccio
(74) *Attorney, Agent, or Firm*—Louis Woo

(57) ABSTRACT

An information recording and reproducing apparatus includes a memory for storing a signal whose amount corresponds to a minimum recording unit. First data is reproduced from a minimum-recording-unit corresponding portion of a recording medium. The minimum-recording-unit corresponding portion contains a designated editing point. The reproduced first data is stored into the memory. A boundary between frames represented by the first data in the memory is detected. The detected boundary corresponds to the editing point. An address of a storage segment in the memory is stored which corresponds to the detected boundary. A first portion of the first data in the memory which corresponds to the stored address and later addresses is replaced by second data while a second portion of the first data in the memory which corresponds to addresses preceding the stored address is left to generate third data composed of the second data and the second portion of the first data in the memory. The third data is recorded on the minimum-recording-unit corresponding portion of the recording medium.

4 Claims, 3 Drawing Sheets

METHOD AND APPARATUS FOR RECORDING AND REPRODUCING INFORMATION

BACKGROUND OF THE INVENTION

1. Field of the Invention

This invention relates to an apparatus for recording and reproducing information. This invention also relates to a method of recording and reproducing information.

2. Description of the Related Art

A known digital recording and reproducing apparatus compressively encodes an input video signal into a first digital video signal of a given code. Every segment of the first digital video signal which corresponds to a predetermined number M of frames (a plurality of frames) is processed as follows. Words of a given error correction code are generated in response to every M-frame-corresponding segment of the first digital video signal. The error correction code words and the M-frame-corresponding segment of the first digital video signal are combined into an M-frame-corresponding segment of a second digital video signal. The second digital video signal is subjected to modulation for record. The modulation-resultant video signal is recorded on a magnetic tape.

The known digital recording and reproducing apparatus reproduces a video signal from a magnetic tape. The reproduced video signal is subjected to demodulation. Every M-frame-corresponding segment of the demodulation-resultant digital video signal is separated into error correction code words and an M-frame-corresponding segment of a third digital video signal. The M-frame-corresponding segment of the third digital video signal is corrected into an M-frame-corresponding segment of a fourth digital video signal in response to the error correction code words. The fourth digital video signal is decoded into an original video signal. The known digital recording and reproducing apparatus outputs the decoding-resultant video signal, that is, the reproduced original video signal.

A first video signal which has been recorded on a magnetic tape can be edited by the known digital recording and reproducing apparatus. For example, a second video signal is recorded over a portion of the first video signal which follows an editing point. In this case, only the portion of the first video signal which precedes the editing point remains on the magnetic tape. In the known digital recording and reproducing apparatus, the first video signal results from the processing of video information M frames by M frames. Accordingly, it is desirable that the editing point coincides with the boundary between M-frame-corresponding segments of the first video signal. In this case, during playback implemented after the editing process, all the video information represented by the remaining portion of the first video signal on the magnetic tape can be reproduced. On the other hand, in the case where the editing point is in an intermediate part of an M-frame-corresponding segment of the first video signal, after the editing process, the video information represented by a remaining part of the M-frame-corresponding segment of the first video signal will fail to be reproduced during playback. Thus, in the known digital recording and reproducing apparatus, the minimum unit of movement of the editing point corresponds to M frames.

SUMMARY OF THE INVENTION

It is a first object of this invention to provide an apparatus for recording and reproducing information which can implement an editing process having a smaller unit of movement of an editing point.

It is a second object of this invention to provide a method of recording and reproducing information which can implement an editing process having a smaller unit of movement of an editing point.

A first aspect of this invention provides an information recording and reproducing apparatus comprising a memory for storing a signal whose amount corresponds to a minimum recording unit; first means for reproducing first data from a minimum recording-unit corresponding portion of a recording medium, the minimum-recording-unit corresponding portion containing a designated editing point; second means for storing the first data reproduced by the first means into the memory; third means for detecting a boundary between frames represented by the first data in the memory which has been stored thereinto by the second means, the detected boundary corresponding to the editing point; fourth means for storing an address of a storage segment in the memory which corresponds to the boundary detected by the third means; fifth means for replacing a first portion of the first data in the memory which corresponds to the address stored by the fourth means and later addresses by second data while leaving a second portion of the first data in the memory which corresponds to addresses preceding the address stored by the fourth means to generate third data composed of the second data and the second portion of the first data in the memory; and sixth means for recording the third data on the minimum-recording-unit corresponding portion of the recording medium.

A second aspect of this invention is based on the first aspect thereof, and provides an information recording and reproducing apparatus wherein information recorded on the recording medium is divided into pieces each corresponding to the minimum recording unit, and each of the pieces of the information has a fixed amount of data.

A third aspect of this invention provides a method of recording and reproducing information which uses a memory for storing a signal whose amount corresponds to a minimum recording unit. The method comprises the steps of reproducing first data from a minimum-recording-unit corresponding portion of a recording medium, the minimum-recording-unit corresponding portion containing a designated editing point; storing the reproduced first data into the memory; detecting a boundary between frames represented by the first data in the memory, the detected boundary corresponding to the editing point; storing an address of a storage segment in the memory which corresponds to the detected boundary; replacing a first portion of the first data in the memory which corresponds to the stored address and later addresses by second data while leaving a second portion of the first data in the memory which corresponds to addresses preceding the stored address to generate third data composed of the second data and the second portion of the first data in the memory; and recording the third data on the minimum-recording-unit corresponding portion of the recording medium.

A fourth aspect of this invention is based on the third aspect thereof, and provides a method wherein information recorded on the recording medium is divided into pieces each corresponding to the minimum recording unit, and each of the pieces of the information has a fixed amount of data.

DESCRIPTION OF THE PREFERRED EMBODIMENTS

First Embodiment

Figure 1:
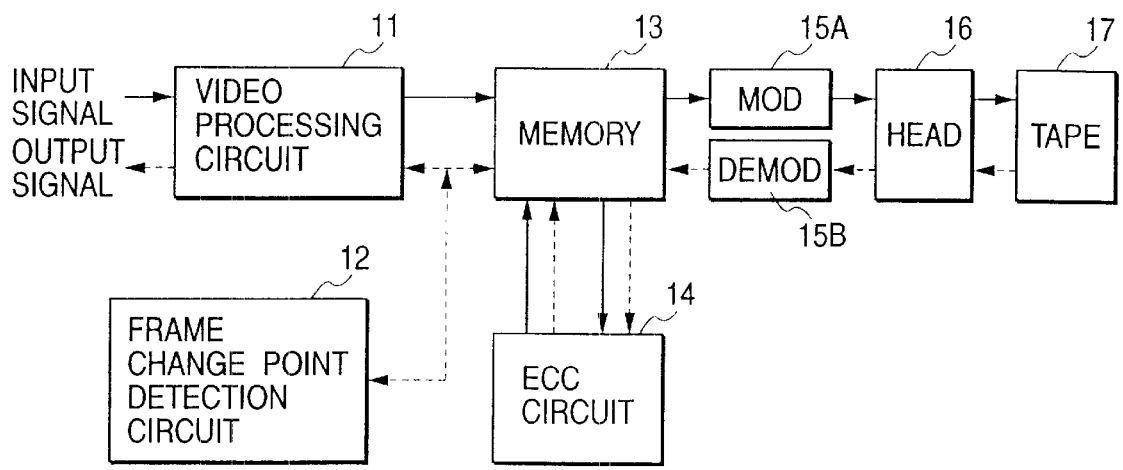
FIG. 1 is a block diagram of an information recording and reproducing apparatus according to a first embodiment of this invention.

FIG. 1 shows an information recording and reproducing apparatus according to a first embodiment of this invention. The apparatus of FIG. 1 includes a video processing circuit 11, a frame change point detection circuit 12, a memory 13, an error correction code (ECC) circuit 14, a modulation circuit 15A, a demodulation circuit 15B, and a magnetic head 16. For example, the magnetic head 16 has a plurality of sub magnetic heads.

The video processing circuit 11 is connected to the memory 13. The frame change point detection circuit 12 is connected to the video processing circuit 11 and the memory 13. The memory 13 is connected to the modulation circuit 15A and the demodulation circuit 15B. The ECC circuit 14 is connected to the memory 13. The modulation circuit 15A and the demodulation circuit 15B are connected to the magnetic head 16. The magnetic head 16 is mounted on a rotary drum. A magnetic tape 17 is wrapped around the rotary drum in a predetermined angular range. The magnetic tape 17 can be fed relative to the rotary drum while being scanned by the magnetic head 16.

Operation of the apparatus in FIG. 1 can be changed among different modes including a recording mode, a playback mode, and an editing mode.

During the recording mode of operation, the video processing circuit 11 receives an input video signal. The video processing circuit 11 includes an encoder. The video processing circuit 11 encodes the input video signal into a first digital video signal of a given code. The video processing circuit 11 may compressively encode the input video signal into a digital video signal of a predetermined code which conforms with a type of the MPEG (Moving Picture Experts Group) standards. The video processing circuit 11 feeds the first digital video signal to the memory 13. The first digital video signal is divided into successive segments each corresponding to a predetermined number N of frames, where the predetermined number N is equal to a predetermined natural number. For example, the predetermined number N is equal to or greater than two. The first digital video signal is processed N frames by N frames as follows. Every N-frame-corresponding segment of the first digital video signal is temporarily stored in the memory 13. The ECC circuit 14 accesses the N-frame-corresponding segment of the first digital video signal in the memory 13, and generates words of a given error correction code in response to the accessed N-frame-corresponding segment of the first digital video signal. The ECC circuit 14 combines the error correction code words and the N-frame-corresponding segment of the first digital video signal into an N-frame-corresponding segment of a second digital video signal. The ECC circuit 14 writes the N-frame-corresponding segment of the second digital video signal into the memory 13.

During the recording mode of operation, the second digital video signal is read out from the memory 13 before being fed to the modulation circuit 15A. The modulation circuit 15A subjects the second digital video signal to modulation for record. The modulation-resultant video signal is transmitted from the modulation circuit 15A to the magnetic head 16 mounted on the rotary drum. The magnetic head 16 records the modulation-resultant video signal on the magnetic tape 17 while the magnetic tape 17 is fed relative to the rotary drum.

During the playback mode of operation, the magnetic head 16 reproduces a video signal from the magnetic tape 17 while the magnetic tape 17 is fed relative to the rotary drum. The reproduced video signal is transmitted from the magnetic head 16 to the demodulation circuit 15B. The demodulation circuit 15B subjects the reproduced video signal to demodulation which is inverse with respect to the modulation implemented by the modulation circuit 15A. Thus, the demodulation circuit 15B demodulates the reproduced video signal into a third digital video signal (a demodulation-resultant digital video signal). The demodulation circuit 15B feeds the third digital video signal to the memory 13. The third digital video signal is divided into successive segments each corresponding to N frames. The third digital video signal is processed N frames by N frames as follows. Every N-frame-corresponding segment of the third digital video signal is temporarily stored in the memory 13. The ECC circuit 14 accesses the N-frame-corresponding segment of the third digital video signal in the memory 13, and separates the N-frame-corresponding segment of the third digital video signal into error correction code words and an N-frame-corresponding segment of a fourth digital video signal. The ECC circuit 14 corrects the N-frame-corresponding segment of the fourth digital video signal into an N-frame-corresponding segment of a fifth digital video signal in response to the error correction code words. The ECC circuit 14 writes the N-frame-corresponding segment of the fifth digital video signal into the memory 13.

During the playback mode of operation, the fifth digital video signal is read out from the memory 13 before being fed to the video processing circuit 11. The video processing circuit 11 includes a decoder. The video processing circuit 11 decodes the fifth digital video signal into an original video signal. The decoding by the video processing circuit 11 is inverse with respect to the encoding implemented thereby during the recording mode of operation. The video processing circuit 11 outputs the decoding-resultant video signal, that is, the reproduced original video signal.

The editing mode of operation of the apparatus in FIG. 1 is as follows. It is assumed that the number N is equal to or greater than four, and hence N frames are four frames or more. Frames represented by a video signal on the magnetic tape 17 are separated into groups each having N successive frames. Each of these frame groups corresponds to a minimum recording unit.

Figure 2:
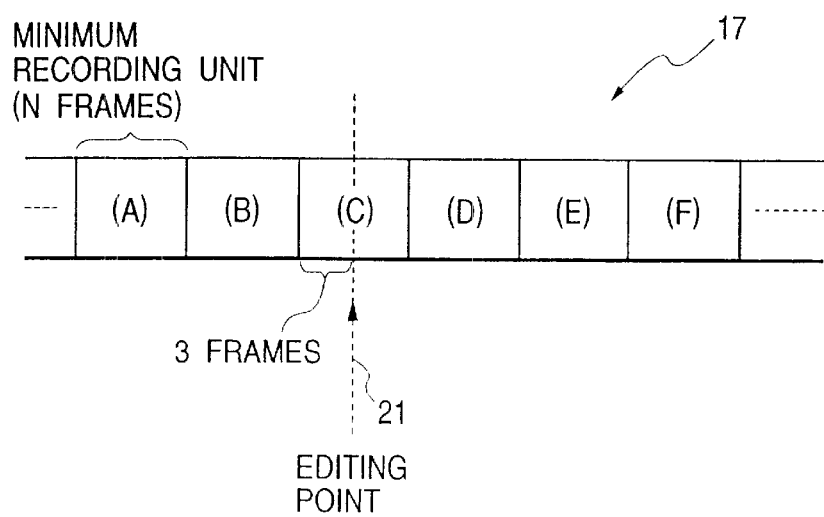
FIG. 2 is a diagram of a sequence of N-frame intervals in a magnetic tape in FIG. 1.

As shown in FIG. 2, the magnetic tape 17 has a sequence of N-frame intervals . . . , (A), (B), (C), (D), (E), (F), . . . to which frame groups are assigned respectively. It is assumed that a designated editing point 21 exists in an intermediate part of the N-frame interval (C), and coincides with the boundary between a third frame and a fourth frame in the group assigned to the N-frame interval (C). The apparatus in FIG. 1 includes an operation unit (not shown) via which a user can designate an editing point. A signal of the designated editing point is generated by actuating the operation unit.

Figure 3:
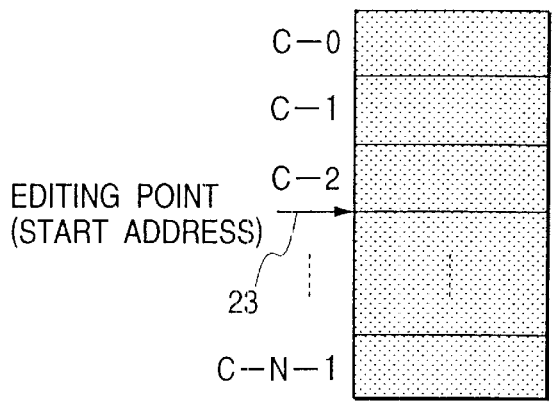
FIG. 3 is a diagram of a first signal storing condition of a memory in FIG. 1.

During a first stage of the editing mode of operation, the magnetic tape 17 is controlled in response to the signal of the designated editing point 21 so that the N-frame interval (C) which contains the designated editing point 21 will be accessed by the magnetic head 16, and playback will be implemented. Specifically, a video signal (an old modulation-resultant video signal) is reproduced from the whole of the N-frame interval (C) by the magnetic head 16. The reproduced video signal is transmitted from the magnetic head 16 to the demodulation circuit 15B. The demodulation circuit 15B demodulates the reproduced video signal into a demodulation-resultant digital video signal. The demodulation circuit 15B feeds the demodulation-resultant digital video signal to the memory 13. The demodulation-resultant digital video signal is written into the memory 13. During the writing of the demodulation-resultant digital video signal into the memory 13, an address signal used in the memory 13 is updated in a normal order. The demodulation-resultant digital video signal which represents N frames in the group assigned to the N-frame interval (C) is thus stored in the memory 13. The ECC circuit 14 accesses the demodulation-resultant digital video signal in the memory 13, and separates the demodulation-resultant digital video signal into error correction code words and an N-frame-corresponding digital video signal. The ECC circuit 14 corrects the N-frame-corresponding digital video signal into a correction-resultant digital video signal in response to the error correction code words. The ECC circuit 14 writes the correction-resultant digital video signal into the memory 13. During the writing of the correction-resultant digital video signal into the memory 13, the address signal used in the memory 13 is updated in the normal order. Then, further writing of data into the memory 13 is suspended. The correction-resultant digital video signal stored in the memory 13 represents N frames in the group assigned to the N-frame interval (C). Specifically, as shown in FIG. 3, a set of the N frames represented by the correction-resultant digital video signal in the memory 13 is a sequence of a first frame C-0, a second frame C-1, a third frame C-2, a fourth frame C-3, . . . , and an N-th frame C-N-1. The designated editing point 21 (see FIG. 2) coincides with the boundary between the third frame C-2 and the fourth frame C-3. The memory 13 includes a plurality of storage segments having different addresses. The storage segments are separated into N sets which correspond to the first frame C-0, the second frame C-1, the third frame C-2, the fourth frame C-3, . . . , and the N-th frame C-N-1 respectively. The addresses of storage segments in a set corresponding to a frame precede those of storage segments in a set corresponding to a next frame. The N storage-segment sets constitute N memory areas which correspond to the first frame C-0, the second frame C-1, the third frame C-2, the fourth frame C-3, . . . , and the N-th frame C-N-1 respectively.

During a second stage of the editing mode of operation, the correction-resultant digital video signal is read out from the memory 13 before being fed to the video processing circuit 11 and the frame change point detection circuit 12. During the readout of the correction-resultant digital video signal from the memory 13, the address signal used in the memory 13 is updated in the normal order. The video processing circuit 11 decodes the correction-resultant digital video signal into an original video signal. The video processing circuit 11 outputs the decoding-resultant video signal, that is, the reproduced original video signal. The memory 13 includes a storage portion and an address generator. The storage portion has a plurality of storage segments having different addresses. In the memory 13, the address generator produces the address signal, and applies the address signal to the storage portion. One of the storage segments which has an address currently represented by the address signal is selected as an object to be accessed. The frame change point detection circuit 12 monitors the address signal used in the memory 13. The frame change point detection circuit 12 detects the boundaries between frames represented by the correction-resultant digital video signal read out from the memory 13. The frame change point detection circuit 12 may include a frame sync detector. In this case, the detection of the inter-frame boundaries is implemented by referring to frame sync components of the correction-resultant digital video signal. In addition, the frame change point detection circuit 12 detects specified addresses which are represented by the address signal, and which correspond to the detected inter-frame boundaries respectively. To implement the detection of the specified addresses, the frame change point detection circuit 12 may include a latch for sampling and holding the address signal at a moment corresponding to each of the detected inter-frame boundaries. Specifically, the specified addresses are start addresses for the 1-frame-corresponding memory areas respectively. The frame change point detection circuit 12 receives the signal of the designated editing point 21. The frame change point detection circuit 12 selects one from among the specified addresses in response to the signal of the designated editing point 21. Specifically, the specified address which corresponds to the designated editing point 21 is selected. The frame change point detection circuit 12 includes a register into which the selected specified address is stored. Since the designated editing point 21 coincides with the boundary between the third frame C-2 and the fourth frame C-3, the stored specified address 23 (see FIG. 3) corresponds to that boundary. The stored specified address 23 is a start address for the memory area corresponding to the fourth frame C-3.

Figure 4:
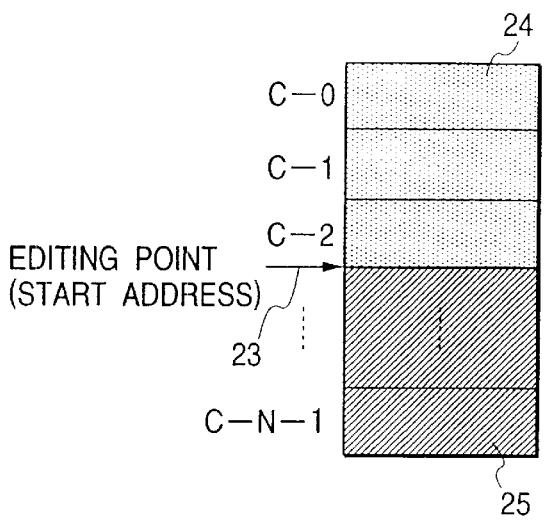
FIG. 4 is a diagram of a second signal storing condition of the memory in FIG. 1.

During a third stage of the editing mode of operation, the playback is terminated and then the magnetic tape 17 is rewound. In this case, the position of the magnetic tape 17 relative to the position of the magnetic head 16 is servo-controlled in a known way so that the starting position of the N-frame interval (C) will correspond to the position of the magnetic head 16. Subsequently, a new input video signal is fed to the video processing circuit 11. The video processing circuit 11 compressively encodes the new input video signal. The video processing circuit 11 feeds the new encoding-resultant digital video signal to the memory 13. The frame change point detection circuit 12 controls the address generator in the memory 13, and thereby sets the address signal in a state corresponding to the stored specified address 23. Then, the new encoding-resultant digital video signal starts to be written into the memory 13 while the address signal starts to be updated in the normal order from the state corresponding to the stored specified address 23. Thus, the writing of the new encoding-resultant digital video signal into the memory 13 starts from a position denoted by the start address (the stored specified address 23) for the memory area corresponding to the fourth frame C-3. As shown in FIG. 4, the new encoding-resultant digital video signal 25 is written over the old digital video signal (the previously-mentioned correction-resultant digital video signal) which represents the fourth frame C-3, the fifth frame C-4, . . . , and the N-th frame C-N-1. In other words, the new encoding-resultant digital video signal corresponding to N-3 successive frames replaces the old digital video signal which represents the fourth frame C-3, the fifth frame C-4, . . . , and the N-th frame C-N-1. On the other hand, the old digital video signal (the previously-mentioned correction-resultant digital video signal) 24 which represents the first frame C-0, the second frame C-1, and the third frame C-2 remains in the memory 13 as it is (see FIG. 4). As a result, an N-frame-corresponding combination of the old and new digital video signals is stored in the memory 13.

Figure 5:
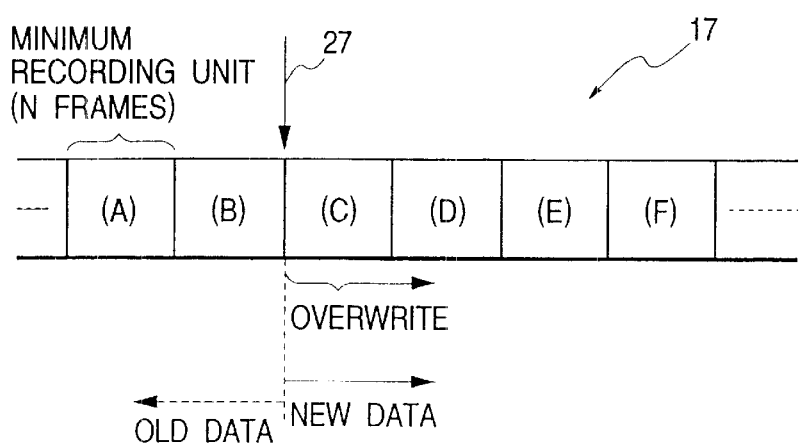
FIG. 5 is a diagram of a sequence of N-frame intervals in the magnetic tape in FIG. 1.

During a fourth stage of the editing mode of operation, the ECC circuit 14 accesses the N-frame-corresponding combination of the old and new digital video signals in the memory 13, and generates words of the given error correction code in response to the accessed N-frame-corresponding signal combination. The ECC circuit 14 adds the error correction code words and the N-frame-corresponding signal combination into an N-frame-corresponding segment of an ECC-added digital video signal. The ECC circuit 14 writes the N-frame-corresponding segment of the ECC-added digital video signal into the memory 13. During the writing of the N-frame-corresponding segment of the ECC-added digital video signal into the memory 13, the address signal used in the memory 13 is updated in the normal order. The N-frame-corresponding segment of the ECC-added digital video signal is read out from the memory 13 before being fed to the modulation circuit 15A. During the readout of the N-frame-corresponding segment of the ECC-added digital video signal from the memory 13, the address signal used in the memory 13 is updated in the normal order. The modulation circuit 15A subjects the N-frame-corresponding segment of the ECC-added digital video signal to modulation for record. The modulation-resultant video signal is transmitted from the modulation circuit 15A to the magnetic head 16. The magnetic head 16 records the modulation-resultant video signal on the magnetic tape 17 while the magnetic tape 17 is fed relative to the rotary drum. Specifically, the modulation-resultant video signal begins to be recorded on the magnetic tape 17 from the starting position of the N-frame interval (C). Accordingly, the N-frame-corresponding segment of the modulation-resultant video signal which corresponds to the N-frame-corresponding combination of the old and new digital video signals in the memory 13 is recorded over the N-frame-corresponding segment of the old modulation-resultant video signal on the N-frame interval (C) in the magnetic tape 17. As shown in FIG. 5, the N-frame-corresponding segment of the modulation-resultant video signal is recorded as an N-frame-corresponding segment of a new modulation-resultant video signal on an overwriting basis. In this case, an apparent editing point 27 exists at the boundary between the N-frame interval (B) and the N-frame interval (C) in the magnetic tape 17. The new modulation-resultant video signal on first, second, and third 1-frame-corresponding blocks of the N-frame interval (C) is equal in video contents to the old modulation-resultant video signal thereon. On the other hand, the new modulation-resultant video signal on fourth and later 1-frame-corresponding blocks of the N-frame interval (C) is usually different from the old modulation-resultant video signal thereon.

During a fifth stage of the editing mode of operation, the new input video signal representing a next frame group and later frame groups is processed into a new modulation-resultant signal, and the new modulation-resultant signal is recorded over the old modulation-resultant video signal on the N-frame interval (D) and the later N-frame intervals in the magnetic tape 17.

As understood from the previous explanation, the minimum unit of movement of an actual editing point corresponds to one frame.

Second Embodiment

A second embodiment of this invention is similar to the first embodiment thereof except for design changes mentioned hereinafter. The second embodiment of this invention is directed to a digital VTR (video tape recorder) conforming to the D-VHS (registered trademark) standards. The D-VHS VTR acts to record an MPEG signal.

Figure 6:
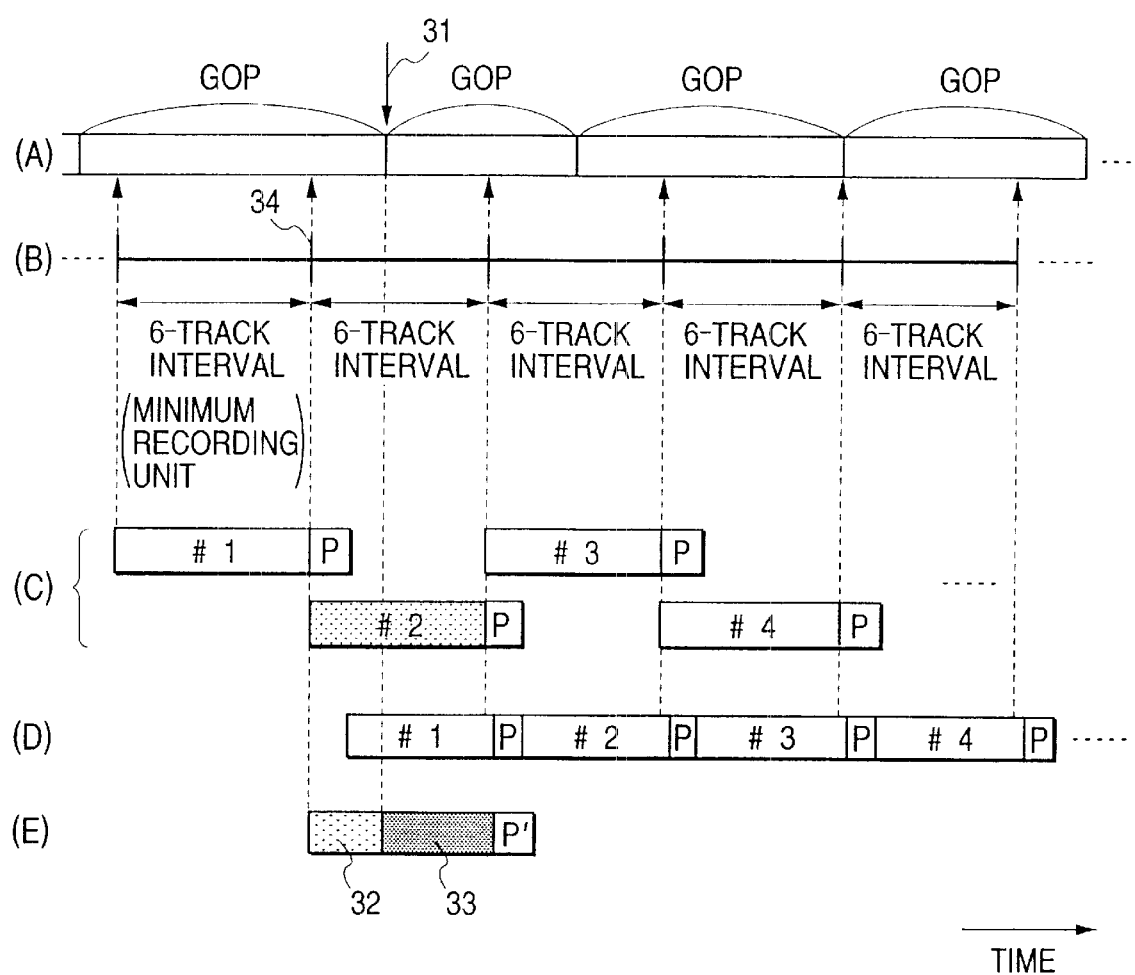
FIG. 6 is a time-domain diagram of signals in a second embodiment of this invention.

As shown in the portion (A) of FIG. 6, the MPEG signal has a sequence of group-of-pictures (GOP's) which are variable in bit length. For example, one typical GOP corresponds to about fifteen frames. As shown in the portion (B) of FIG. 6, the D-VHS VTR records a signal on a magnetic tape 17 (see FIG. 1) in fixed-length unit, that is, unit corresponding to six tracks.

During a recording mode of operation of the D-VHS VTR, as shown in the portion (C) of FIG. 6, MPEG data to be recorded for a 6-track-corresponding time interval is periodically stored in a memory 13 (see FIG. 1). The 6-track-corresponding MPEG data in the memory 13 is prepared independent of the boundaries between GOP's. An ECC circuit 14 (see FIG. 1) generates an ECC signal P in response to the 6-track-corresponding MPEG data in the memory 13. The ECC circuit 14 combines the 6-track-corresponding MPEG data and the ECC signal P into ECC-added 6-track-corresponding MPEG data. The ECC circuit 14 writes the ECC-added 6-track-corresponding MPEG data into the memory 13. Thus, as shown in the portion (C) of FIG. 6, the 6-track-corresponding MPEG data #1 and the related ECC signal P which compose the ECC-added 6-track-corresponding MPEG data is stored in the memory 13.

During the recording mode of operation, the 6-track-corresponding MPEG data #1 and the related ECC signal P are read out from the memory 13 for a 6-track-corresponding time interval. The rate of reading data from the memory 13 is set higher than the rate of writing data into the memory 13. As shown in the portion (D) of FIG. 6, the 6-track-corresponding MPEG data #1 and the related ECC signal P are recorded on the magnetic tape 17 after being modulated by a modulation circuit 15A (see FIG. 1). A sequence of processes similar to the above-mentioned processes is iterated. As understood from the previous explanation, in the D-VHS VTR, a minimum recording unit corresponds to six tracks (see the portion (B) of FIG. 6).

An editing mode of operation of the D-VHS VTR is as follows. It is assumed that as shown in FIG. 6, a designated editing point 31 coincides with the boundary between GOP's which is also the boundary between frames.

During a first stage of the editing mode of operation, the magnetic tape 17 is controlled in response to a signal of the designated editing point 31 so that a 6-track interval in the magnetic tape 17 which contains the designated editing point 31 will be accessed by a magnetic head 16 (see FIG. 1), and playback will be implemented. Specifically, a video signal (an old modulation-resultant video signal) is reproduced from the whole of the 6-track interval by the magnetic head 16. The reproduced video signal is transmitted from the magnetic head 16 to a demodulation circuit 15B (see FIG. 1). The demodulation circuit 15B demodulates the reproduced video signal into a demodulation-resultant digital video signal. The demodulation circuit 15B feeds the demodulation-resultant digital video signal to the memory 13. The demodulation-resultant digital video signal is written into the memory 13. As a result, the demodulation-resultant digital video signal which corresponds to six tracks is stored in the memory 13. The ECC circuit 14 accesses the demodulation-resultant digital video signal in the memory 13, and separates the demodulation-resultant digital video signal into an ECC signal P and a 6-track-corresponding digital video signal. The ECC circuit 14 corrects the 6-track-corresponding digital video signal into a correction-resultant digital video signal in response to the ECC signal P. The ECC circuit 14 writes the correction-resultant digital video signal into the memory 13. Then, further writing of data into the memory 13 is suspended. The correction-resultant digital video signal stored in the memory 13 corresponds to six tracks.

During a second stage of the editing mode of operation, the correction-resultant digital video signal is read out from the memory 13 before being fed to a video processing circuit 11 (see FIG. 1) and a frame change point detection circuit 12 (see FIG. 1). The video processing circuit 11 decodes the correction-resultant digital video signal into an original video signal. The video processing circuit 11 outputs the decoding-resultant video signal, that is, the reproduced original video signal. The frame change point detection circuit 12 monitors an address signal used in the memory 13. The frame change point detection circuit 12 detects the boundaries between frames represented by the correction-resultant digital video signal read out from the memory 13. In addition, the frame change point detection circuit 12 detects specified addresses which are represented by the address signal, and which correspond to the detected inter-frame boundaries respectively. Specifically, the specified addresses are start addresses for 1-frame-corresponding memory areas respectively. The frame change point detection circuit 12 receives the signal of the designated editing point 31. The frame change point detection circuit 12 selects one from among the specified addresses in response to the signal of the designated editing point 31. Specifically, the specified address which corresponds to the designated editing point 31 is selected. The frame change point detection circuit 12 includes a register into which the selected specified address is stored. The stored specified address is a start address for the 1-frame-corresponding memory area to which the recorded signal portion immediately following the designated editing point 31 is assigned.

During a third stage of the editing mode of operation, the playback is terminated and then the magnetic tape 17 is rewound. In this case, the position of the magnetic tape 17 relative to the position of the magnetic head 16 is servo-controlled in a known way so that the starting position 34 of the 6-track interval in the magnetic tape 17 which contains the designated editing point 31 will correspond to the position of the magnetic head 16.

Subsequently, a new input video signal is fed to the video processing circuit 11. The video processing circuit 11 compressively encodes the new input video signal. The video processing circuit 11 feeds the new encoding-resultant digital video signal to the memory 13. The frame change point detection circuit 12 sets the address signal in a state corresponding to the stored specified address. Then, the new encoding-resultant digital video signal starts to be written into the memory 13 while the address signal starts to be updated from the state corresponding to the stored specified address. Thus, the writing of the new encoding-resultant digital video signal into the memory 13 starts from a position denoted by the start address (the stored specified address) for the 1-frame-corresponding memory area to which the recorded signal portion immediately following the designated editing point 31 is assigned. As shown in the portion (E) of FIG. 6, the new encoding-resultant digital video signal 33 is written over the old digital video signal (the previously-mentioned correction-resultant digital video signal) which represents frames following the designated editing point 31. On the other hand, the old digital video signal (the previously-mentioned correction-resultant digital video signal) 32 which represents frames preceding the designated editing point 31 remains in the memory 13 as it is (see the portion (E) of FIG. 6). As a result, a 6-track-corresponding combination of the old and new digital video signals is stored in the memory 13.

During a fourth stage of the editing mode of operation, the ECC circuit 14 accesses the 6-track-corresponding combination of the old and new digital video signals in the memory 13, and generates a new ECC signal P' in response to the accessed 6-track-corresponding signal combination. The ECC circuit 14 adds the new ECC signal P' and the 6-track-corresponding signal combination into a 6-track-corresponding segment of an ECC-added digital video signal. The ECC circuit 14 writes the 6-track-corresponding segment of the ECC-added digital video signal into the memory 13. The 6-track-corresponding segment of the ECC-added digital video signal is read out from the memory 13 before being fed to the modulation circuit 15A. The modulation circuit 15A subjects the 6-track-corresponding segment of the ECC-added digital video signal to modulation for record. The modulation-resultant video signal is transmitted from the modulation circuit 15A to the magnetic head 16. The magnetic head 16 records the modulation-resultant video signal on the magnetic tape 17 while the magnetic tape 17 is fed relative to a rotary drum. Specifically, the modulation-resultant video signal begins to be recorded on the magnetic tape 17 from the starting position 34 of the 6-track interval therein (see the portion (B) of FIG. 6). Accordingly, the 6-track-corresponding segment of the modulation-resultant video signal which corresponds to the 6-track-corresponding combination of the old and new digital video signals in the memory 13 is recorded over the 6-track-corresponding segment of the old modulation-resultant video signal on the 6-track interval in the magnetic tape 17. The 6-track-corresponding segment of the modulation-resultant video signal is recorded as a 6-track corresponding segment of a new modulation-resultant video signal on an overwriting basis. The new modulation-resultant video signal on the magnetic tape portion preceding the designated editing point 31 is equal in video contents to the old modulation-resultant video signal thereon. On the other hand, the new modulation-resultant video signal on the magnetic tape portion following the designated editing point 31 is usually different from the old modulation-resultant video signal thereon.

Third Embodiment

A third embodiment of this invention is similar to the first embodiment or the second embodiment thereof except for the following design change. The third embodiment of this invention is directed to an information recording and reproducing apparatus using an optical disc or another recording medium.

What is claimed is:

1. An information recording and reproducing apparatus comprising:

a memory for storing a signal whose amount corresponds to a minimum recording unit;

first means for reproducing first data from a minimum-recording-unit corresponding portion of a recording medium, the minimum-recording-unit corresponding portion containing a designated editing point;

second means for storing the first data reproduced by the first means into the memory;

third means for detecting a boundary between frames represented by the first data in the memory which has been stored thereinto by the second means, the detected boundary corresponding to the editing point;

fourth means for storing an address of a storage segment in the memory which corresponds to the boundary detected by the third means;

fifth means for replacing a first portion of the first data in the memory which corresponds to the address stored by the fourth means and later addresses by second data while leaving a second portion of the first data in the memory which corresponds to addresses preceding the address stored by the fourth means to generate third data composed of the second data and the second portion of the first data in the memory; and sixth means for recording the third data on the minimum-recording-unit corresponding portion of the recording medium.

2. An information recording and reproducing apparatus as recited in claim 1, wherein information recorded on the recording medium is divided into pieces each corresponding to the minimum recording unit, and each of the pieces of the information has a fixed amount of data.

3. A method of recording and reproducing information which uses a memory for storing a signal whose amount corresponds to a minimum recording unit, the method comprising the steps of:

reproducing first data from a minimum-recording-unit corresponding portion of a recording medium, the minimum-recording-unit corresponding portion containing a designated editing point;

storing the reproduced first data into the memory;

detecting a boundary between frames represented by the first data in the memory, the detected boundary corresponding to the editing point;

storing an address of a storage segment in the memory which corresponds to the detected boundary;

replacing a first portion of the first data in the memory which corresponds to the stored address and later addresses by second data while leaving a second portion of the first data in the memory which corresponds to addresses preceding the stored address to generate third data composed of the second data and the second portion of the first data in the memory; and recording the third data on the minimum-recording-unit corresponding portion of the recording medium.

4. A method as recited in claim 3, wherein information recorded on the recording medium is divided into pieces each corresponding to the minimum recording unit, and each of the pieces of the information has a fixed amount of data.

* * * * *